US006459223B2

(12) United States Patent
Mauel et al.

(10) Patent No.: US 6,459,223 B2
(45) **Date of Patent: *Oct. 1, 2002**

(54) MOTOR VEHICLE DOOR LOCK AND PROCESS FOR ITS CONTROL

(75) Inventors: Ingo Mauel; Rainer Josef Berger, both of Remscheid (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/780,627

(22) Filed: Feb. 12, 2001

(30) Foreign Application Priority Data

May 3, 2000 (DE) ........................................ 100 21 186

(51) Int. Cl.$^7$ ................................................. H02P 7/00

(52) U.S. Cl. ....................... 318/445; 318/282; 318/286; 318/466; 318/468; 292/DIG. 7; 292/DIG. 3; 292/216; 292/201

(58) Field of Search ................................ 318/282, 286, 318/466, 468, 445; 292/201, 216, DIG. 3, DIG. 4, DIG. 7, DIG. 23

(56) References Cited

U.S. PATENT DOCUMENTS

| | | | | | |
|---|---|---|---|---|---|
| 4,111,474 | A | * | 9/1978 | Heyder | 292/144 |
| 4,843,849 | A | * | 7/1989 | Kamke et al. | 70/264 |
| 5,656,899 | A | * | 8/1997 | Kuroda | 318/283 |
| 5,762,384 | A | * | 6/1998 | Bartel | 292/216 |
| 6,139,073 | A | * | 10/2000 | Heffner et al. | 292/201 |
| 6,175,202 | B1 | * | 1/2001 | Weyerstall et al. | 318/280 |

* cited by examiner

*Primary Examiner*—Robert E. Nappi
*Assistant Examiner*—Rina I. Duda
(74) *Attorney, Agent, or Firm*—Nixon Peabody LLP; David S. Safran

(57) ABSTRACT

A motor vehicle door lock and a process for controlling a motor vehicle door lock, the motor vehicle door lock having an electric motor drive for reaching a set position based upon at least one operating parameter such as a start-up characteristic acquired when the drive is started up. The electric motor drive is shut off and short circuited prior to the set position in time and in position. In order to achieve high positioning accuracy, deviations from the set positions are acquired to correct the shut-off point for later positioning.

14 Claims, 2 Drawing Sheets

MOTOR VEHICLE DOOR LOCK AND PROCESS FOR ITS CONTROL

BACKGROUND OF THE INVENTION

1. Field of the Invention

This invention relates to a motor vehicle door lock such as a side door lock, a rear door lock, a rear hatch lock, or a hood lock and a process for controlling a motor vehicle door lock.

2. Description of the Related Art

A motor vehicle door lock with the aforementioned mentioned features is known from practice and includes an electric motor drive for an assigned actuating or locking element of the motor vehicle door lock and a sensor for acquiring the position, especially the rotary position of the drive or the assigned actuating element, and a control means which for positioning of the drive or the actuating element in a set position shuts off or short circuits the drive at a shut-off point which precedes the set position in time and position. The electric motor drive at the shut-off point has a certain energy of motion which leads to a considerable slowing down, therefore to further motion until the drive and thus the actuating element stop. Accurate positioning of the actuating element in the set position is however only possible if the actual slowing down is considered when the shutoff point is established. It has been found in practice that the slowing down depends on various influences such that the positioning accuracy is adversely affected thereby.

SUMMARY OF THE INVENTION

An object of the present invention is to provide a motor vehicle door lock with an electric motor positioning drive and a process for control thereof to obtain accurate positioning independent of production tolerances under various operating conditions.

The object is achieved so that the actual position of the drive and of the actuating element is acquired or determined in the shut-off state and that for deviations from the set position the shut-off point is corrected accordingly for future positioning. Thus, adaptation is easily enabled which leads to enhanced precision positioning in the set position. In particular, production tolerances can be automatically balanced by the aforementioned measure. Furthermore, very accurate positioning is enabled even under different operating conditions.

Preferably, at least one current operating characteristic, for example, a start-up characteristic of at least one of the drive and the assigned actuating element, is acquired or determined when the drive is actuated. The at least one operating characteristic is used to establish a shut-off point which precedes the set position in time and position. In particular, it has been recognized that the start-up behavior of the drive can also be used to draw conclusions about the braking behavior of the drive. Thus, without using an additional sensor, better or more accurate characterization of the operating behavior of the drive or its electric motor is possible.

In general, a plurality of different operating or start-up characteristics can be determined. In a preferred embodiment, it is provided that the voltage which is applied to the electric motor drive when the drive is actuated is acquired as a first start-up characteristic, at least if the drive variable. Additionally, at least one of an initial speed, acceleration of at least one of the drive and the assigned actuating element is acquired as a second start-up characteristic. It has been found that by using the start-up characteristics, the required time or the positional setting of the shut-off point in advance of the set position which is to be assumed in the shut-off state can be established or determined. This can be explained by the fact that from the two indicated start-up characteristics, the temperature of the drive, which has a major effect upon its braking and shut-off behavior, can be estimated or approximately determined by using these start-up characteristics. Accordingly, depending upon the estimated temperature or the two aforementioned start-up characteristics, the advanced positioning of the shut-off point which is necessary for accurate positioning can be ascertained. In addition, the temperature of the drive can also be directly acquired by means of an additional sensor as an important parameter for establishing the shut-off point.

Generally, the shut-off point is determined depending upon at least one operating parameter while the drive is engaged. In particular, a corresponding table or the corresponding performance data is used to determine the shut-off point based upon one operating parameter or on several current operating parameters. Accordingly pre-established deviations can be stored as a correction table or correction field so that then after establishing the current shut-off point by at least one of a correction table and a correction field based upon at least one current operating parameter, a correction value is determined in order to correct the shut-off point. In the aforementioned process, of course, interpolations are used if necessary. Additionally functional relationships, matrices or the like can be used in performing the process.

Accordingly, the present invention accomplishes feedback during control, however, there is no control which is undesirably time-consuming for positioning at least one of the drive and the actuating element in a set position, but only correction or adaptation of the control parameters for future positioning after establishing a deviation. Other details, features, objectives and advantages of this invention are detailed below using the drawings of one preferred embodiment.

DETAILED DESCRIPTION OF THE INVENTION

Figure 1:
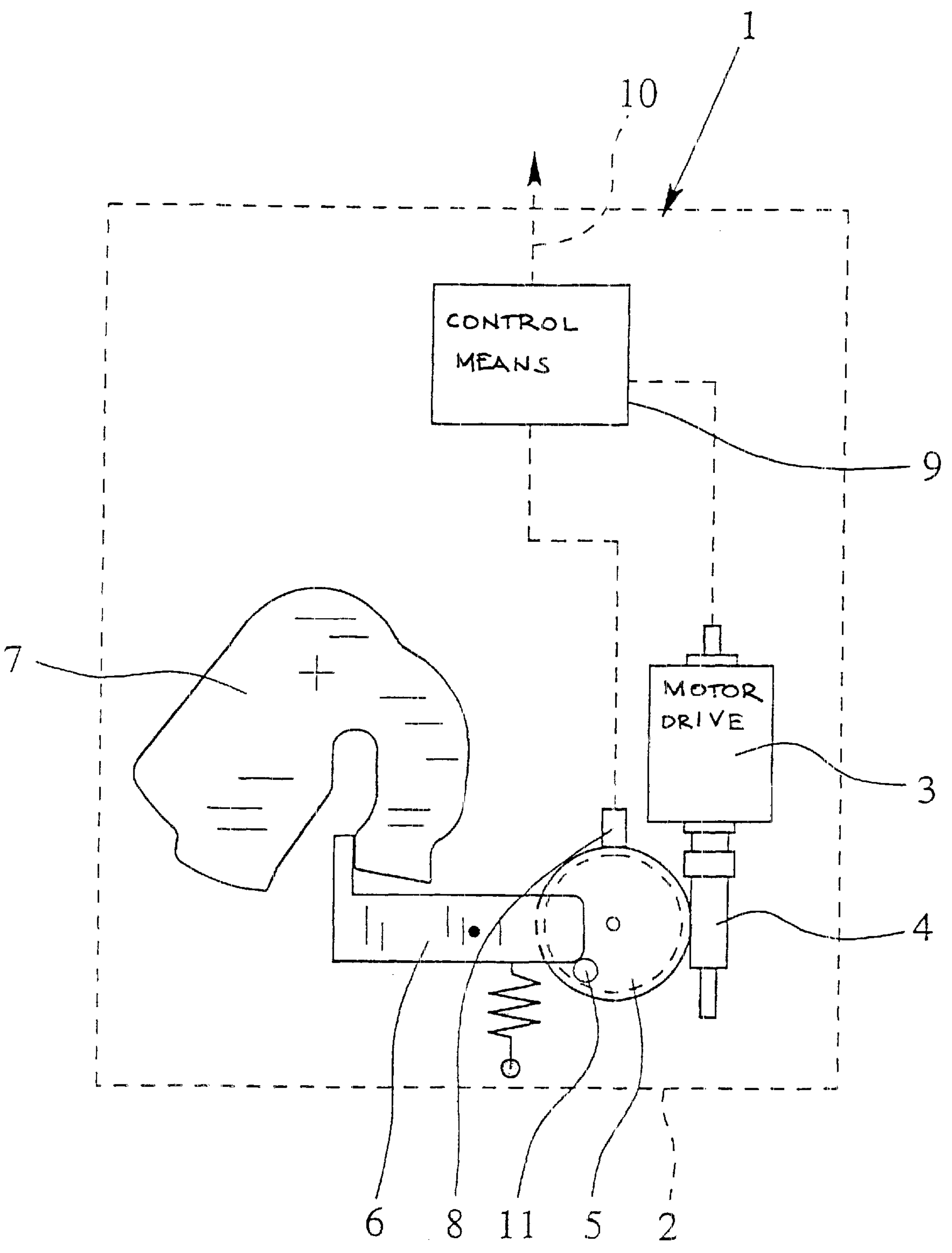
FIG. 1 shows a schematic of a motor vehicle door lock.

And now to the drawings, in which FIG. 1 shows a motor vehicle door lock 1 in accordance with the present invention including a housing 2 (indicated by the broken line) and an electric motor drive 3. The drive 3 comprises an electric motor (not shown) and an adjoining transmission such as a worm gear 4. The drive 3 acts on or engages a locking or actuating element 5 of the motor vehicle door lock 1 and is used to position the actuating element 5 in at least one set position. The actuating element 5 is made, for example, as a worm wheel and meshes with the worm gear 4. The locking or actuating element 5 represents one part of a conventional lock mechanism of the motor vehicle door lock 1 and also acts on a detent pawl 6 for securing an assigned lock latch 7 of the motor vehicle door lock 1. Moreover, the locking or actuating element 5 may also assume other or additional functions and optionally also several actuating functions, and may be positioned especially in the latter case in several set positions.

The motor vehicle door lock 1 furthermore includes a sensor 8 assigned to the actuating element 5 for acquiring the current position of the actuating element 5. Alternatively, the sensor 8 can also be assigned to the drive 3 or integrated into the drive 3. The sensor 8 is made as an incremental detector for acquiring the angular position of at least one of the actuating element 5, the electric motor and the worm gear 4. The sensor 8, however, can also be formed by some other means for acquiring, or optionally, indirectly determining at least one of the actuating or rotary position, the speed and the acceleration of at least one of the drive 3 and the actuating element 5. For example, the sensor 8 may also be a Hall sensor or a plurality of Hall sensors or an optical sensor, a mechanical sensor, such as at least one microswitch, or the like. Alternatively, the lock 1 may also include a current ripple counting or acquisition and evaluation (so-called ripple count) for acquiring the number of revolutions, the rotary speed or other operating parameters. This acquisition can be integrated into a drive control (not shown) or into another other control.

The motor vehicle door lock 1 further includes a controller or control means 9 comprising a micro-controller for controlling the drive 3, especially for actuating (and turning off) the drive 3. The control means 9 is electrically connected via a terminal 10 to motor vehicle electronics (not shown), for example, a central interlock system, and/or an actuating switch. The sensor 8 is electrically connected to the control means 9 so that the control means 9 can at least one of acquire and indirectly determine at least one of the angular position and the angular speed of at least one of the actuating element 5 and the drive 3.

Figure 2:
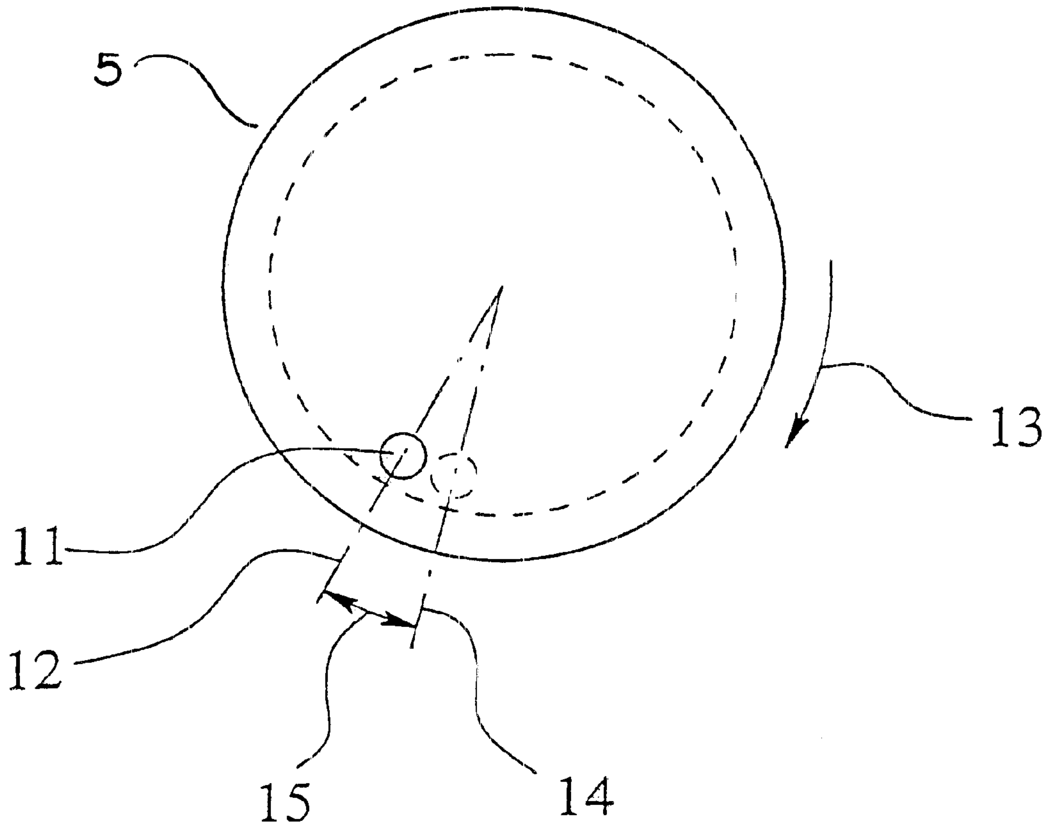
FIG. 2 shows a schematic of the determination of the shut-off point.

Positioning in the desired set position is detailed below using FIG. 2. The actuating element 5 is disk-like and bears a journal-like function element 11 which projects in the axial direction of the actuating element 5 and swivels a detent pawl 6 depending upon the rotary position of the actuating element 5. To position the actuating element 5 or the function element 11 in a set position 12, such as a desired angular position, for the direction of motion or rotation 13 of the actuating element 5, the electric drive motor 3 is at least one of turned off at a shut-off point 14, and, depending upon the version of the electric motor drive 3 and the desired braking, is short-circuited. The shut-off point 14 is placed in advance of the set position 12 either positionally by the braking distance or the braking angle 15 against the direction 13 of motion or rotation of the actuating element or in time by the braking time. The braking distance or braking time which is required by the drive 3 or the actuating element 5 after the drive 3 is shut off, therefore starting from the shut-off point 14, depends upon the slowing down of the drive 3 and the actuating element 5 after the drive 3 is shut off. The shut-off point 14 can, therefore, be determined by the interval in time or space from the set position 12, depending upon how the control means 9 functions.

It is provided that the control means 9 when the drive 3 is actuated (started-up), or in the immediately subsequent (start-up) phase, acquires at least one start-up characteristic which at least indirectly characterizes the operating state of the drive 3 or its electric motor, or some other operating parameter. The start-up characteristic which is re-determined preferably for each turn-on or start-up is then used to fix or vary or correct the shut-off point 14. While it is preferred that the start-up characteristics are acquired or updated each time the drive 3 is started or turned on, acquisition of the start-up characteristics can be repeated only when a stipulated minimum time has transpired. The expression “start-up characteristic” should be understood by those skilled in the art in the sense that at least one parameter is encompassed which allows characterization of the starting behavior of the drive 3 based upon the current operating state. In particular, several start-up characteristics can also be acquired. The corresponding applies to other operating parameters which can be acquired alternatively or additionally to the establishment of the shut-off point 14.

The distance traveled and the angle traversed by at least one of the drive 3 and the actuating element 5 in a definable time from the start-up or engagement of the drive 3 is acquired by the control means 9 as a start-up characteristic. Alternatively, the time necessary for a certain distance traveled and a certain angle traversed can be acquired by the control means 9 as a start-up characteristic. One such start-up characteristic in combination with the voltage applied to the drive 3 allows enhanced determination or estimation of the temperature of the drive 3. Since heat has a major effect upon the braking behavior or the slowing down of the drive 3 and the actuating element 5, the shut-off point 14 can be appropriately set or corrected directly from the indicated start-up characteristic and the voltage and/or with interim estimation of the temperature of the drive 3 or the value correlated therewith, so that positioning in the set position 11 at rest can be obtained.

Additionally, at least one of the initial or average speed, acceleration, and the values of the drive 3 and of the actuating element 5 are derived from or corresponding to the aforementioned start-up characteristic or at least one of the actual speed, acceleration of at least one of the drive 3 and the actuating element 5, measurable after a certain start-up time, is determined or acquired as a start-up characteristic. In particular, based upon the voltage applied to the drive 3, parameters for determining or estimating the temperature of the drive 3 and/or of the slowing down or the braking behavior of the drive 3 may be obtained. The temperature, if used as an operating parameter to establish or determine the shut-off point 14, can also be acquired via the sensor 8 or a separate sensor (not shown). Current measurement or acquisition of the voltage applied to the drive 3 can be omitted if it is always constant; this however is not always the case in a motor vehicle. In addition, the power consumption of the drive 3 in the start-up phase can be acquired as the start-up characteristic.

Preferably, each time the drive 3 is actuated (started up), a first start-up characteristic is acquired, such as the rpm or the speed of the drive 3, when at least one of the drive 3 and the actuating element 5 reaches a first position or when a predetermined time after engagement has transpired. Acquisition can take place via the sensor 8 for position acquisition, and the rpm or the speed of the drive 3 can be determined from the behavior of the current or by means of at least one of a second sensor and an incremental detector or the like (not shown). It is also possible to use a clock base or time base or the like which is conventionally present anyway in the control means 9.

Furthermore, the current temperature is acquired or determined as the second operating parameter or start-up characteristic via at least one of another sensor (not shown) from at least one start-up characteristic of at least one of the drive 3 and the actuating element 5. For example, a determination or estimation of the current temperature of the drive can be made from two start-up characteristics, for example, the time duration of how long at least one of the drive 3 and the actuating element 5 needs to move by a predetermined angle of rotation or by what angle of rotation at least one of the drive 3 and the actuating element 5 moves within a predetermined time, and the voltage on the drive 3 via at least one of a function and a table stored or filed in the control unit 9.

Subsequently, the expected slowing down or braking angle 15 is ascertained from the aforementioned two operating characteristics. Accordingly, the initially temporary shut-off point 14 is established by the control means 9 and takes place by the shut-off point 14 which is stipulated as the base setting and/or the braking angle 15 which is stipulated as the base setting being corrected or changed depending upon the ascertained or acquired operating parameters. Of course, the temporary braking angle 15 and/or the shut-off point 14 can also be directly determined from the two indicated operating parameters, especially in turn using a function and/or a table which is filed in the control means 9 or performance data which are filed in the control means 9. It goes without saying that intermediate values can be interpolated if necessary.

After determining the temporary braking angle 15 or the shut-off point 14 in accordance with the present invention, if necessary, a correction takes place in order to obtain at least one of the final braking angle 15 and shut-off point 14 at which the drive 3 is in fact shut off during the current positioning process. In particular, it is provided that a correspondingly matched correction table or a correspondingly matched correction field stored or filed in the control means 9 is used based upon at least one operating parameter, and delivers a correction value which is added or subtracted with consideration of the corresponding sign to the temporary braking angle 15 or shut-off point 14 in order to obtain the final braking angle 15 or shut-off point 14. Of course, intermediate values can also be interpolated here if necessary. Also functional relationships, matrices or the like can be used in doing so. Correction values can also be made available in some other way by the control means 9.

After establishing the final braking angle or shut-off point 14 the drive 3 is shut off when the shut-off point 14 is reached. As a result of slowing down, the actuating element 5 continues to move until the drive 3 and the actuating element 5 stop whereby the actuating element assumes the actual position (not shown) which corresponds as much as possible to the set position. It is provided in accordance with the present invention that the actual position of the actuation element 5 or the function element 11 is acquired by the sensor 8 or other sensor means. The control means 9 determines the deviation of the actual position from the set position 12; therefore, the difference is formed. This deviation or difference is filed or stored as a correction value in the control means 9. Accordingly, the aforementioned correction table or the aforementioned correction field can be formed by at least one of considering or assigning at least one operating parameter, preferably all operating parameters, which was or were used to determine the temporary braking angle 15 or the shut-off point 14. In particular, for deviations from zero various correction values can be stored accordingly in the correction table or the correction field. These correction values are then used in subsequent positionings based upon the operating parameters. Accordingly adaptive correction which leads to an increase of positioning accuracy easily results.

Of course, the correction can also take place by other processing, display or storage of correction values or by another control sequence. In particular, for example, a threshold value can be stipulated so that only deviations of the actual position from the set position 12 which quantitatively exceed the threshold value lead to a change of the corresponding correction values. The present invention is advantageous since, at very little cost, accurate positioning can be obtained for prompt stopping and especially without control.

In accordance with the present invention, the actuating element 5 executes rotary motion, while the actuating element 5 may also execute linear or superimposed motion. In addition, the present invention is not limited to a motor vehicle door lock 1, but may also be applied to any electric motor positioning drive. The present invention is, however, used especially in actuating and drive systems in motor vehicles, since economical and reliably operating systems with a simple structure are desired.

We claim:

1. A motor vehicle door lock comprising:

an actuating element an electric motor drive for engaging said actuating element;

a sensor electrically connected to said electric motor drive for acquiring at least one of an angular position and angular velocity of at least one of said electric motor drive and said actuating element; and control means for controlling stopping of said electric motor drive at a predetermined stopped position based upon signals received from said sensor by at least one of turning off and short circuiting said electric motor drive at a predetermined shut-off point which precedes the predetermined stopped position in time and position by an amount determined based on said signals from said sensor;

wherein said control is adapted to utilize at least one of an actual position of at least one of said electric drive motor and said actuating element and a deviation of said actual position from at least one of said predetermined stopped position of said electric motor drive and a predetermined position of said actuating element in at least one of the shut-off state and the short circuit state to correct the shut-off point in a manner causing subsequent stopping of said electric drive motor to occur closer to said predetermined stopped position.

2. The motor vehicle door lock as claimed in claim 1, wherein at least one operating parameter of at least one of said electric motor drive and said actuating element is obtained for establishing the shut-off point.

3. The motor vehicle door lock as claimed in claim 2, wherein said at least one operating parameter includes at least one of a voltage, angular speed, angular displacement, time, angular acceleration, predetermined time after start-up, power consumption and voltage of at least one of said electric motor drive and said actuating element.

4. The motor vehicle door lock as claimed in claim 3, wherein the shut-off point is obtained based upon an actual temperature of said electric motor drive.

5. The motor vehicle door lock as claimed in claim 3, wherein the shut-off point is obtained based upon an estimated temperature of said electric motor drive determined using said at least one operating parameter.

6. The motor vehicle door lock as claimed in claim 3, wherein the shut-off point is obtained using at least one of a braking distance and a braking time of said electric motor drive based upon the set position.

7. The motor vehicle door lock as claimed in claim 3, wherein the braking distance or the braking time is obtained based upon at least one of a start-up characteristic and the temperature of the electric motor drive derived from said start-up characteristic.

8. The motor vehicle door lock as claimed in claim 1, wherein control is adapted to utilize the actual position at least one of said electric motor drive and said actuating element to correct the shut-off point.

9. The motor vehicle door lock as claimed in claim 1, wherein control is adapted to utilize the deviation of the actual position from at least one of said predetermined stopped position of said electric motor drive and said predetermined position of the actuating element to correct the shut-off point.

10. Process for controlling a motor vehicle door lock with an electric motor drive for an assigned actuating element, said process comprising the steps of:

establishing a set position for said electric motor drive by at least one of shutting off and short-circuiting at least one of said electric motor drive and said actuating element at a shut-off point which precedes the set position in time and position, acquiring an actual position of at least one of said electric motor drive and said actuating element in the shut-off state; and determining a deviation value of the actual position from the set position; and correcting the shut-off point based upon the deviation value.

11. The process as claimed in claim 10, wherein the deviation value is stored as a correction value used for correcting the shut-off point when the shut-off point is established.

12. The process as claimed in claim 11, wherein at least one of a start-up characteristic and the temperature of at least one of said electric motor drive and said actuating element is acquired, and wherein the shut-off point is established based upon at least one of a start-up characteristic and the temperature and the set position.

13. The process as claimed in claim 12, wherein a plurality of correction values are stored based upon at least one of the start-up characteristics and the temperatures, and wherein said plurality of correction values are used accordingly for subsequent correction of the shut-off point.

14. The process as claimed in claim 13, wherein at least one of angular distance, time, speed and angular acceleration of at least one of said electric motor drive and said actuating element, a predetermined time after start-up of said electric motor drive, power consumption of said electric motor drive, the voltage applied to said electric motor drive are obtained as a start-up characteristic.

* * * * *